June 17, 1969  A. F. RIETVELD  3,450,572
METHOD OF ASSEMBLING A PELTIER BATTERY WITH HEAT
EXCHANGERS AND DEVICE SO CONSTRUCTED
Filed April 15, 1963  Sheet 1 of 2

INVENTOR.
ANDREAS F. RIETVELD
BY
AGENT

INVENTOR
ANDREAS F. RIETVELD

United States Patent Office 3,450,572
Patented June 17, 1969

3,450,572
METHOD OF ASSEMBLING A PELTIER BATTERY WITH HEAT EXCHANGER AND DEVICE SO CONSTRUCTED
Andreas Fredericus Rietveld, Drachten, Netherlands, assignor, by mesne assignments, to U.S. Philips Corporation, New York, N.Y., a corporation of Delaware
Filed Apr. 15, 1963, Ser. No. 273,115
Claims priority, application Netherlands, Apr. 24, 1962, 277,587
Int. Cl. H01v 1/28
U.S. Cl. 136—203                 2 Claims

ABSTRACT OF THE DISCLOSURE

The invention relates to a thermo-electric battery comprising at least one thermo-electric element, which is unilaterally clamped between two heat exchangers having, beyond the clamping area, two opposite faces with a layer of thermally insulating material sandwiched between them. There will usually be provided a number of preferably series-connected thermo-electric elements forming together a battery. Such elements and batteries are termed Peltier elements and Peltier batteries after the name of the scientist who discovered the effect on which they are based. Hereinafter they will both be termed Peltier battery. The phenomenon with such devices is that upon the passage of current at given contact areas the temperature drops, whereas it rises at other contact areas. In order to utilize this effect it is known to clamp a Peltier device between heat exchangers capable of withdrawing heat from the surroundings at one area and of giving off heat at another area. In order to avoid unwanted heat transmission a heat-insulating layer is used between the heat exchangers beyond the clamping area. Said layer may consist of heat-insulating usually porous material or it may be formed by air or a gas.

A Peltier battery often consists for a large part of semi-conductive material e.g. bismuth and/or antimony telluride in the form of comparatively brittle bodies. Since the heat exchangers, which are mostly made of metal, may have a heavy weight and may be exposed to comparatively great forces during mounting or in operation, the problem arises that the Peltier battery should be arranged between the heat exchangers so that it is rigidly clamped with accurate fit, in order to avoid thermal transition resistances and that the forces exerted on one or on both heat exchangers are not transferred to the Peltier battery. Finally the various parts are to be assembled so that a maximum heat insulation is obtained between the heat exchangers.

In accordance with the invention with the device of the kind set forth the two opposite faces of the heat exchangers are interconnected beyond the clamping area at least at two places by bridge pieces consisting at least partly of heat-insulating material and partly of a material having passed at the area concerned from the liquid phase to the solid phase.

In an advantageous embodiment such a bridge piece is formed by a body of cast resin having two cast-in anchors associated each with one heat exchanger.

The boundary of such a bridge piece may be of insulating material which fills at least partly the further space between the heat exchangers.

The bridge pieces are preferably arranged symmetically around the Peltier battery.

The invention furthermore relates to a cooling device e.g. a refrigerator comprising a space to be cooled, surrounded by a thermally insulating layer provided locally with a thermo-electric device according to the invention.

The method of manufacturing such a thermo-electric device is characterised in that the Peltier battery and the heat exchangers are arranged in their relative definite positions, said heat exchangers having each at least one anchor forming a pair with the other and in that between the heat exchangers at least one mould is formed accommodating a pair of these anchors and being filled with a hardening cast resin.

One of the heat exchangers, the Peltier battery and the moulds may first be assembled in their relative, definite positions, after which the moulds are filled with a cast resin and the other heat exchanger is arranged in its definite position, its anchors penetrating into the still liquid cast resin, which is subsequently hardened. In a further advantageous embodiment the heat exchangers are provided with one or more filling openings for the moulds. The moulds can thus be filled after the two heat exchangers have been arranged in their definite relative positions.

The invention will now be described more fully with reference to a few embodiments shown in the figures.

Figure 1:
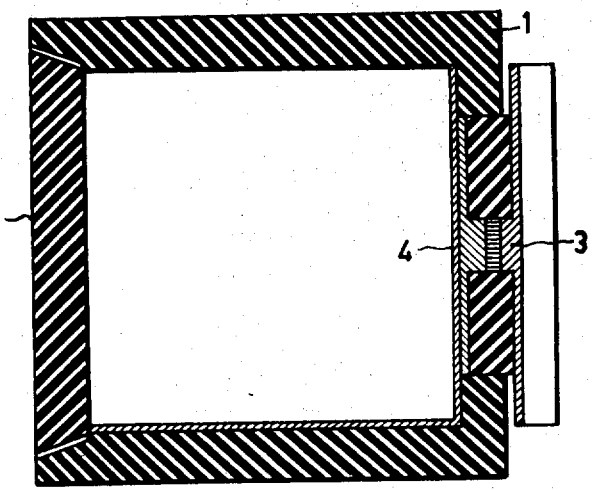
FIG. 1 shows diagrammatically in a cross sectional view a refrigerator comprising a thermo-electric device according to the invention.
Figure 3:
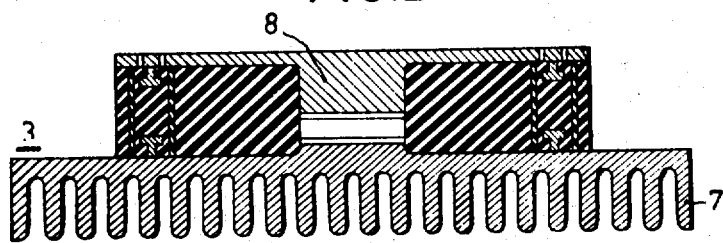
Figure 4:
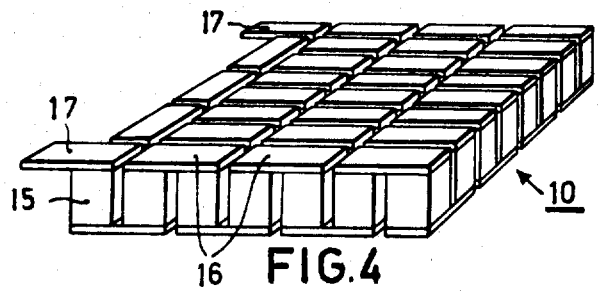
FIG. 4 shows diagrammatically the structure of a Peltier battery.

The refrigerator shown in FIG. 1 comprises the housing 1 mainly consisting of thermally insulating material and having an access door 2. A thermo-electric assembly 3 is provided for cooling the interior of housing 1, the inner side of which is in thermal contact with the metal inner wall 4 of the housing 1. The thermo-electric assembly 3 is shown on an enlarged scale in FIGS. 2 and 3. It comprises two heat exchangers 6 and 7, each having an elevated part 8 and 9 respectively at their center and between which the Peltier battery 10 is arranged. The structure of such a battery may be as shown in FIG. 4 or any other configuration. In the preferred embodiment the battery 10 comprises a number of semi-conductive bars 15, alternately of p- and n-conductivity type, connected in series by means of copper connecting pieces 16 soldered to the semi-conductor bars 15 and defining a number of rows lying side by side so that an assembly in the form of a parallelepiped is obtained. The electric current can be supplied via two connections 17. With a given direction of the supply current the upper connecting pieces 16 (FIG. 4) are cooled, whereas the lower pieces 16 are heated. This assembly, which is highly vulnerable due to the brittleness of semi-conductive material and the presence of many solder joints, is clamped between two thin electrically insulating foils and the elevated parts 8 and 9 of the heat exchangers. In order to provide a good mechanical connection between the two heat exchangers 6 and 7, and the Peltier battery to obtain a low thermal resistance, without risking breakage of the semi-conductor bars 15, and at the same time preventing transfer of heat from one heat exchanger to the other, the exchangers are each provided with four anchors 20, which are shaped in the form of a mushroom or T. The anchors 20 are arranged pairwise one opposite the other and surrounded by a tube 21. In the heat exchanger 6 there are provided filling apertures 22, which open into the interior of tube 21. Between the two heat exchangers 6 and 7 there is furthermore provided a piece of porous heat-insulating material 23, having openings for the elevated parts 8 and 9 and also the tubes 21.

Figure 2:
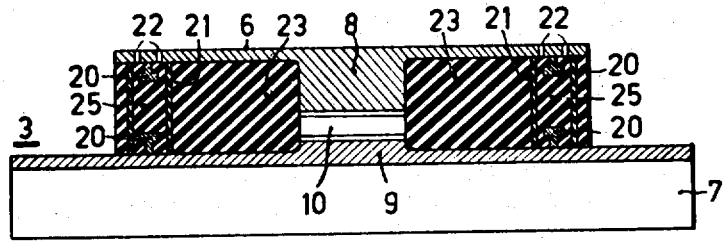
FIGS. 2 and 3 show diagrammatically said device on an enlarged scale.

After these parts are arranged in the positions shown in FIGS. 2 and 3 and the Peltier battery 10 is subjected to a light pressure, the tolerances of the various parts being chosen so that the opposite faces of the elevations 8 and 9 are intimately engaged with the upper side and the lower side of the Peltier battery 10, the tubes 21 are filled with a liquid resin, for example an epoxy resin, known under the trade name of Araldite, which subsequently hardens forming bridges 25 in situ.

This provides the important advantage that the heat exchangers are first disposed accurately on the Peltier battery before the bridges 25 are formed, which thus match the correct position of the heat exchangers. After the resin hardens, which may give rise to a small amount of shrinkage which slightly improves the clamping of the Peltier battery, the four bridge pieces 25 are formed between the heat exchangers 6 and 7, said pieces providing mechanical stability for the assembly.

Figure 5:
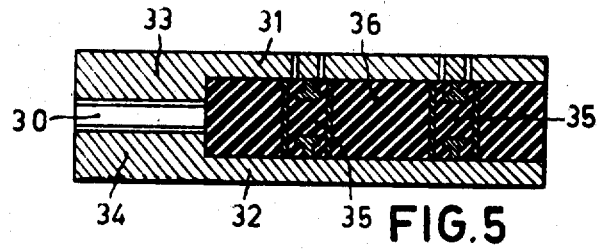
FIGS. 5, 6 and 7 show diagrammatically further embodiments of a thermo-electric device according to the invention.

FIG. 5 shows another arrangement of a thermo-electric device according to the invention, in which the Peltier battery 30 is clamped asymmetrically between the heat exchangers 31 and 32, provided with elevated parts 33 and 34 respectively. The bridge pieces 35, which may be of the same type as the bridge pieces 25 of FIG. 2, are not arranged regularly around the Peltier battery 30, but are located only on one side of the battery. Since the bridge pieces 35 are at different distances from the Peltier battery 30, a mechanically rigid structure is obtained. One or both heat exchangers 31 or 32 may be in contact with an object to be cooled or an object absorbing heat or they may be provided with cooling vanes.

Figure 6:
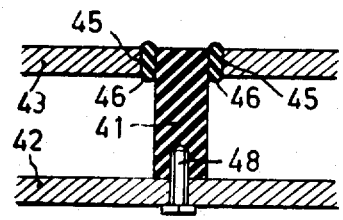
Figure 7:
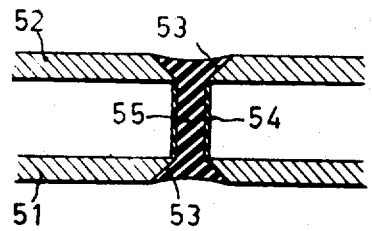

It will be obvious that the invention is not restricted to the embodiments described above and that those skilled in the art may apply many variations within the scope of the invention. The bridge pieces may be constructed as is shown in FIG. 6 wherein the bridge piece 41, 46 consists of a preformed bar 41, which is at least partly thermally insulating and which may be fastened by means of a bolt 48 to one heat exchanger 42. The other heat exchanger 43 is attached to bar 41 by a part 46 having passed in situ from the liquid phase to the solid phase. The bar 41 extends with a certain amount of clearance in an opening 45 of a heat exchanger 43. The part 46 may consist of a cast resin or solder. A further variant of the bridge pieces is shown in FIG. 7. The heat exchangers 51 and 52 are provided with outwardly diverging tapered openings 53, between which a slightly elastic tube 54 is arranged. The tube 54 and the openings 53 are filled with cast resin 55. Owing to the tapering shape of the openings 53 a rigid clamping joint is obtained. The openings 22 (see FIG. 2) for filling the tubes 21 may be dispensed with if the tubes 21 are filled with a cast resin before the upper heat exchanger 6 is arranged in its place. When the heat exchanger 6 is set in place the anchors 20 associated herewith penetrate into the still liquid cast resin which is thereafter hardened.

What I claim is:
1. A method of assembling heat exchanger apparatus, comprising a pair of heat exchanger elements in contact with a Peltier battery and separated by heat insulating material, comprising the steps of positioning the heat exchanger elements in spaced relation; positioning the Peltier battery intermediate said exchanger element, electrically insulating said battery from said exchanger elements, compressing said elements, battery and insulation into thermal contacting relationship; applying liquid thermosetting resin to a plurality of positions laterally spaced from said battery thereby forming columns interconnecting said exchanger elements, solidifying said resin while maintaining the compression forces on said exchanger elements and removing said compression forces after solidification of said resin interconnecting columns.

2. Heat exchanger apparatus comprising: a pair of heat exchanger elements in opposed parallel spaced relation; a thermally conductive electrically insulating means covering opposing surfaces of said spaced elements; a Peltier battery positioned between said electrical insulating means, said Peltier battery comprising alternating p and n conductivity semi-conductor bars connected in series to metal connector bars, said metal connector bars providing substantially planar faces for engaging said electrical insulating means; thermal and electrical insulating means disposed between said heat exchanger elements and adjacent said battery means; and a plurality of clamping means positioned laterally of said battery for holding said heat exchanger elements in rigid spaced relation and in clamping engagement with said battery, said clamping means comprising synthetic thermosetting resin bridging means normal to and engaged with said elements thereby resisting tension and compression forces applied to said elements, said heat exchanger elements being each provided with opposed anchoring pieces projecting into the space between said elements, said anchoring pieces fixedly engaging said synthetic thermosetting resin bridging means.

References Cited

UNITED STATES PATENTS

| | | | |
|---|---|---|---|
| 2,840,916 | 7/1958 | Mueller | 264—261 X |
| 2,973,627 | 3/1961 | Lackey et al. | 136—230 X |
| 3,014,611 | 12/1961 | Marshall | 264—261 X |
| 3,030,951 | 4/1962 | Mandarino | 264—261 X |
| 3,167,925 | 2/1965 | Elfving | 62—3 |

ALLEN B. CURTIS, *Primary Examiner.*

U.S. Cl. X.R.

264—261